(12) United States Patent
Aviely

(10) Patent No.: US 11,023,277 B2
(45) Date of Patent: Jun. 1, 2021

(54) SCHEDULING OF TASKS IN A MULTIPROCESSOR DEVICE

(71) Applicant: RAMON CHIPS LTD., Yokneam Illit (IL)

(72) Inventor: Peleg Aviely, Kadima (IL)

(73) Assignee: RAMON CHIPS LTD., Yokneam Illit (IL)

( * ) Notice: Subject to any disclaimer, the term of this patent is extended or adjusted under 35 U.S.C. 154(b) by 176 days.

(21) Appl. No.: 16/331,993

(22) PCT Filed: Sep. 19, 2017

(86) PCT No.: PCT/IB2017/055648
§ 371 (c)(1),
(2) Date: Mar. 11, 2019

(87) PCT Pub. No.: WO2018/055507
PCT Pub. Date: Mar. 29, 2018

(65) Prior Publication Data
US 2019/0258511 A1    Aug. 22, 2019

Related U.S. Application Data

(60) Provisional application No. 62/396,837, filed on Sep. 20, 2016.

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/3836* (2013.01); *G06F 9/46* (2013.01);
(Continued)

(58) Field of Classification Search
CPC ........ G06F 9/4881; G06F 9/46; G06F 9/4843; G06F 9/485; G06F 9/50; G06F 9/5016; G06F 9/5027; G06F 9/52; G06F 9/3836
See application file for complete search history.

(56) References Cited

U.S. PATENT DOCUMENTS

| | | |
|---|---|---|
| 5,202,987 A | 4/1993 | Bayer et al. |
| 7,155,716 B2 * | 12/2006 | Hooman ............... G06F 9/4881 718/102 |

(Continued)

FOREIGN PATENT DOCUMENTS

| | | |
|---|---|---|
| EP | 0750255 A2 | 12/1996 |
| EP | 230938 A1 | 4/2011 |

(Continued)

OTHER PUBLICATIONS

Quadri et al., "Modeling of Topologies of Interconnection Networks based on Multidimensional Multiplicity", Institut National De Recherche en Informatique et en Automatique, pp. 1-57, May 2007.

(Continued)

*Primary Examiner* — Jacob D Dascomb
(74) *Attorney, Agent, or Firm* — Kligler & Associates Patent Attorneys Ltd

(57) ABSTRACT

Computational apparatus including multiple processing cores, which concurrently execute tasks that are respectively assigned to them. A central scheduling unit (CSU) including a CSU memory holding one or more look-up tables (LUTs) listing tasks for allocation to the processing cores and respective conditions for enabling of each of the tasks. The CSU receives indications of termination of the tasks by the processing cores, and selects, responsively to the indications, enabled tasks from the one or more LUTs for allocation to the processing cores. A network of distribution units are connected between the CSU and the processing cores. The distribution units allocate selected tasks from the CSU (Continued)

to the processing cores for execution and report the termination of the tasks from the processing cores to the CSU.

24 Claims, 4 Drawing Sheets

(51) Int. Cl.
 G06F 9/52 (2006.01)
 G06F 9/46 (2006.01)
 G06F 9/38 (2018.01)
(52) U.S. Cl.
 CPC ............ *G06F 9/485* (2013.01); *G06F 9/4843* (2013.01); *G06F 9/50* (2013.01); *G06F 9/5016* (2013.01); *G06F 9/5027* (2013.01); *G06F 9/52* (2013.01)

(56) References Cited

U.S. PATENT DOCUMENTS

| | | | | |
|---|---|---|---|---|
| 10,572,261 B2* | 2/2020 | Robertson | ............ | G06F 9/3009 |
| 2009/0094605 A1* | 4/2009 | Brelsford | ............. | G06F 9/4843 718/100 |
| 2009/0125685 A1 | 5/2009 | Bayer et al. | | |
| 2012/0020370 A1 | 1/2012 | Sonnier et al. | | |
| 2012/0180068 A1 | 7/2012 | Wein et al. | | |
| 2012/0204183 A1* | 8/2012 | Bayer | .................... | G06F 9/5066 718/102 |
| 2012/0266176 A1 | 10/2012 | Vojnovic et al. | | |
| 2015/0163287 A1 | 6/2015 | Gooding | | |

FOREIGN PATENT DOCUMENTS

| | | |
|---|---|---|
| GB | 2485019 A | 5/2012 |
| WO | 2011027302 A1 | 3/2011 |
| WO | 2015136960 A1 | 9/2015 |

OTHER PUBLICATIONS

International Application # PCT/IB2017/055648 search report dated Dec. 5, 2017.
European Application # 17852503.6 search report dated Mar. 10, 2020.

* cited by examiner

SCHEDULING OF TASKS IN A MULTIPROCESSOR DEVICE

CROSS-REFERENCE TO RELATED APPLICATION

This application claims the benefit of U.S. Provisional Patent Application 62/396,837, filed Sep. 20, 2016, which is incorporated herein by reference.

FIELD OF THE INVENTION

The present invention relates generally to computing devices and methods, and particularly to multiprocessor devices.

BACKGROUND

Multiprocessor devices have a large number of processing cores, which are able to carry out multiple computing tasks in parallel. One of the challenges in designing such devices is to facilitate efficient allocation, scheduling and synchronization of tasks among the cores and high utilization of the available computing power. It is desirable that the device be capable of autonomously distributing tasks in run-time, while enabling the programmer to set the task allocation criteria using a simple, intuitive programming model.

Various methods and architectural solutions are known in the art for scheduling of tasks in a multiprocessor device. For example, U.S. Pat. No. 5,202,987, whose disclosure is incorporated herein by reference, describes a high flow-rate synchronizer/scheduler for a multiprocessor system during program run-time. The synchronizer/scheduler comprises a connection matrix for monitoring and detecting computational tasks that are allowed for execution, containing a task map and a network of nodes for distributing to the processors information or computational tasks detected to be enabled by the connection matrix. The network of nodes possesses the capability of decomposing information on a pack of allocated computational tasks into messages of finer sub-packs to be sent toward the processors, as well as the capability of unifying packs of information on termination of computational tasks into a more comprehensive pack.

SUMMARY

Embodiments of the present invention that are described hereinbelow provide an improved architecture and methods for scheduling of tasks to be carried out by cores of a multiprocessor device.

There is therefore provided, in accordance with an embodiment of the invention, computational apparatus, including multiple processing cores, which are configured to concurrently execute tasks that are respectively assigned to each of the processing cores. A central scheduling unit (CSU) includes a CSU memory configured to hold one or more look-up tables (LUTs) listing tasks for allocation to the processing cores and respective conditions for enabling of each of the tasks. The CSU is configured to receive indications of termination of the tasks by the processing cores, and to select, responsively to the indications, enabled tasks from the one or more LUTs for allocation to the processing cores. A network of distribution units are connected between the CSU and the processing cores and are configured to allocate the selected tasks from the CSU to the processing cores for execution and to report the termination of the tasks from the processing cores to the CSU.

In a disclosed embodiment, the apparatus includes a shared memory, wherein the processing cores are configured to read and write data from and to the shared memory in executing the tasks.

In some embodiments, the network includes a hierarchical tree of the distribution units, including a first plurality of leaf distribution units, each coupled to communicate with a respective group of the processing cores; a second plurality of intermediate distribution units, each coupled to communicate with a respective set of the leaf distribution units; and a single root distribution unit, which is coupled between the CSU and the intermediate distribution units so as to distribute the tasks selected by the CSU among the intermediate distribution units, for allocation via the leaf distribution units to the processing cores, and to consolidate and report the termination of the tasks from the processing cores to the CSU.

In some embodiments, the tasks include duplicable tasks, and the distribution units are configured to allocate multiple instances of the duplicable tasks down the hierarchical tree for concurrent execution among the processing cores. In a disclosed embodiment, the distribution units are configured to receive the indications of the termination of the allocated instances of the duplicable tasks from the processing cores, and to consolidate and report the indications up the hierarchical tree to the root distribution unit, which is configured to submit a single report to the CSU with respect to the termination of multiple allocated instances.

Additionally or alternatively, the processing cores are configured to report to the leaf distribution units upon becoming available to receive a new task, and the leaf and intermediate distribution units are configured to consolidate and report availability of the processing cores up the hierarchical tree to the root distribution unit, which allocates the selected tasks among the intermediate distribution units responsively to the reported availability of the processing cores.

In additional embodiments, the tasks include regular tasks, to be executed by a single processing core, and duplicable tasks, to be allocated in multiple instances for concurrent execution by a plurality of the processing cores. In one embodiment, the indications of the termination of the regular tasks include a flag having multiple possible values, wherein the flag is set by the processing cores upon the termination of each task and is reported by the distribution units to the CSU, which is configured to select a subsequent task for allocation to the processing cores responsively to a value of the flag. In another embodiment, each of the duplicable tasks has a respective quota, and the CSU is configured, when the respective conditions for enabling a given duplicable task are satisfied, to allocate the instances of the duplicable task to the processing cores that are available until the respective quota is reached.

In some embodiments, the one or more LUTs include a task map, which is configured to be defined by a programmer of the apparatus and indicates, for each listed task, the respective conditions for enabling the task, wherein the conditions include the termination of one or more precedent tasks. In one embodiment, the conditions indicated in the task map include, for at least some of the tasks, an event input to the apparatus from a source external to the processing cores. In another embodiment, the conditions for enabling the tasks include, for at least some of the tasks, a logical operation to be applied over the indications of the termination of the one or more precedent tasks. Additionally or alternatively, the listed tasks have respective priorities, and the CSU is configured to select the tasks for allocation to the processing cores from among the enabled tasks responsively to the respective priorities.

There is also provided, in accordance with an embodiment of the invention, a method for computation, which includes providing multiple processing cores, which are configured to concurrently execute tasks that are respectively assigned to each of the processing cores, and are connected by a network of distribution units to a central scheduling unit (CSU), which allocates the tasks to the processing cores. One or more look-up tables (LUTs) are stored in a memory, listing the tasks for allocation to the processing cores and respective conditions for enabling of each of the tasks. The CSU receives from the network of distribution units indications of termination of the allocated tasks by the processing cores and selects, responsively to the indications, enabled tasks from the one or more LUTs for allocation to the processing cores.

The present invention will be more fully understood from the following detailed description of the embodiments thereof, taken together with the drawings in which:

DETAILED DESCRIPTION OF EMBODIMENTS

Overview

Figure 1:
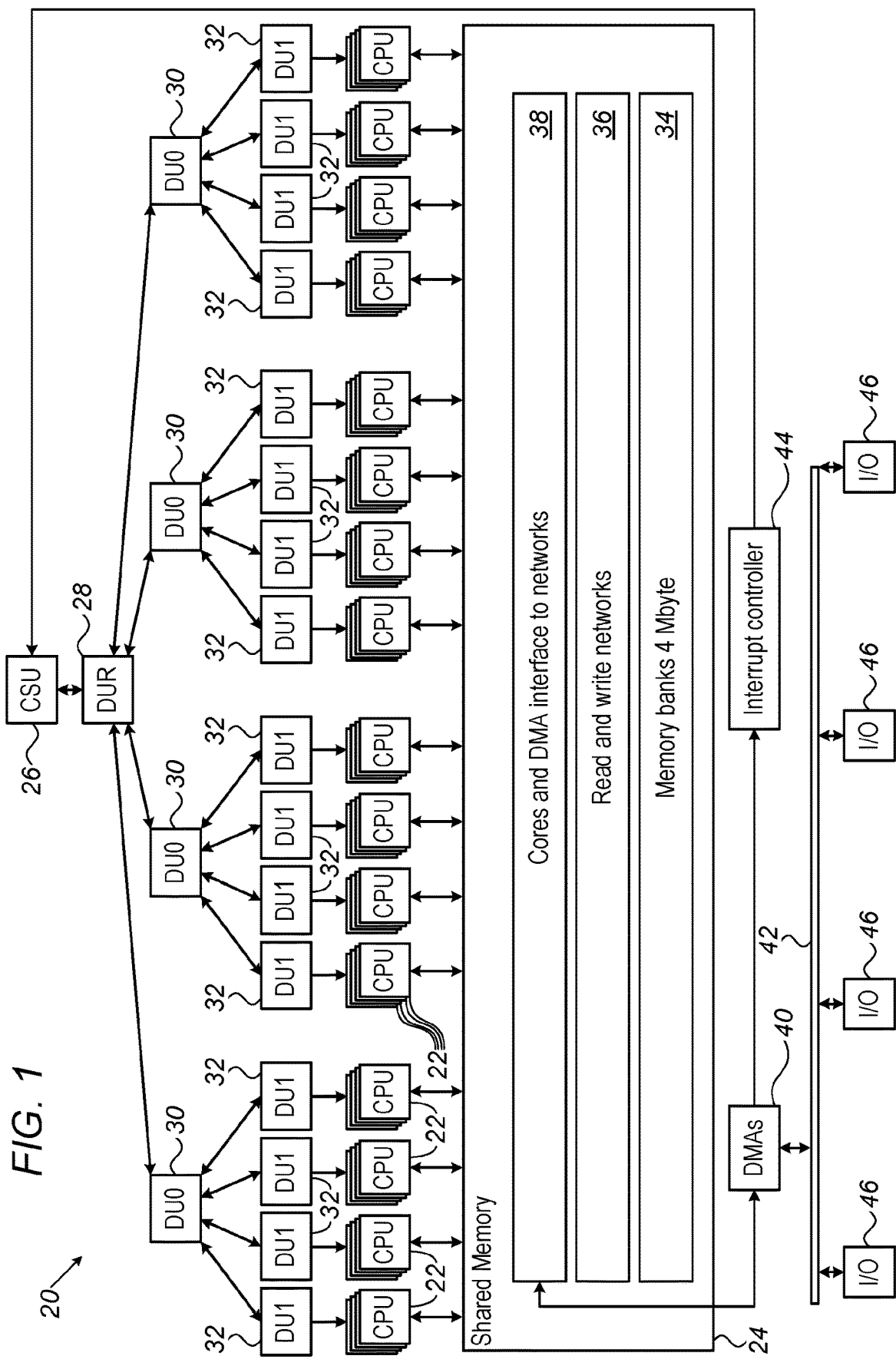
FIG. 1 is a block diagram that schematically illustrates a multiprocessor device, in accordance with an embodiment of the invention.

Efficient scheduling and allocation of tasks among processing cores is one of the major challenges in the design of multiprocessor devices. On the one hand, the scheduling logic and distribution network should be capable of achieving maximal utilization of the available processing resources, meaning that the cores have little idle time between tasks. On the other hand, the task scheduling and distribution architecture should expose a programming model that enables the programmer to specify (and revise) the definition of the tasks to be executed and their interrelations in a simple and straightforward way, while freeing the programmer from having to deal with the underlying hardware and details of task allocation.

Embodiments of the present invention that are described herein provide a novel multiprocessor architecture that addresses these needs, based on programmable look-up tables (LUTs) in the memory of a central scheduling unit (CSU). In the disclosed embodiments, computing apparatus comprises multiple processing cores, which concurrently execute tasks that are assigned to them, typically using a shared memory to read and write data in executing the tasks. The LUTs of the CSU list tasks for allocation to the processing cores and respective conditions for enabling of each of the tasks. The CSU receives indications of termination by the processing cores of their current tasks, and based on these indications uses the LUTs to select tasks that have now been enabled for allocation to the processing cores. The CSU passes the selected tasks to the processing cores via a network of distribution units, which allocate the selected tasks among the processing cores, as well as reporting the termination of the tasks from the processing cores to the CSU.

In the disclosed embodiments, the network of distribution units is organized as a hierarchical tree, including leaf distribution units each coupled to a respective group of the processing cores, intermediate distribution units coupled to respective sets of the leaf distribution units, and a single root distribution unit coupled between the CSU and the intermediate distribution units. The root distribution unit relieves the CSU of the need to deal with actual allocation among the cores of the tasks that it selects for execution, so that the CSU logic can be made smaller and more efficient. The distribution units also consolidate and report the termination of the tasks from the processing cores up the tree to the CSU.

Typically, the apparatus supports a number of different types of tasks, including both regular tasks, each of which is executed by a single processing core, and duplicable tasks, for concurrent execution by multiple cores. The distribution units allocate multiple instances of the duplicable tasks down the hierarchical tree for concurrent execution among the processing cores. Each of the duplicable tasks can be assigned a respective quota. When the respective conditions for enabling a given duplicable task are satisfied, the CSU will allocate the instances of the task to the processing cores that are available until the respective quota is reached. The processing cores pass reports of termination of their allocated instances of duplicable tasks up the tree to the distribution units, which consolidate the termination reports that they receive. Thus, the root distribution unit can count up the terminations and submit a single report to the CSU of the termination of multiple allocated instances (or all the allocated instances).

In some embodiments, the processing cores report to the leaf distribution units when they become available to receive a new task, separately from the termination reports noted above. The leaf distribution units report this availability information up the tree, and the distribution units use the information in allocating the tasks that have been selected by the CSU for execution. The separation between termination reporting and availability reporting is advantageous in enabling the CSU and distribution units to allocate new tasks immediately to cores that become available, even when processing of the termination reports (which is logically complex and may take some time) has not yet been completed, and thus increase the utilization of available computing resources.

In the disclosed embodiments, the LUTs stored in the memory of the CSU comprise a task map, in the form of a connection graph, which can be defined by a programmer. The task map indicates, for each listed task, the respective conditions, in the form of tokens, for enabling the task, such as the termination of one or more precedent tasks and/or an event input from a source external to the processing cores. The enablement conditions for a given task may include a logical operation (such as AND or OR) to be applied by the CSU over the termination indications of the precedent tasks in deciding whether to enable the given task. Additionally or alternatively, the listed tasks may have respective priorities. When more than one task is enabled for execution, the CSU selects the task or tasks to allocate to the processing cores from among the enabled tasks based on the respective priorities.

Further additionally or alternatively, the termination indications of the regular tasks (as opposed to duplicable tasks)

can comprise a flag having two or more possible values. This flag is set by the processing cores upon the termination of each regular task and is reported by the distribution units to the CSU. The conditions for enablement of subsequent tasks may depend on the value of the flag, possibly subject to the logical operations mentioned above.

The description below refers, for the sake of concreteness and clarity, to a particular device architecture and logical structure that the inventors have found to be advantageous for implementation in an integrated circuit (IC) chip. The principles of the present invention, however, may alternatively be applied in other multiprocessor device architectures that are known in the art, with scheduling and distribution networks of different design. All such alternative implementations are considered to be within the scope of the present invention.

System Description

FIG. 1 is a block diagram that schematically illustrates a multiprocessor device 20, in accordance with an embodiment of the invention. Device 20 comprises multiple processing cores 22 (sixty-four cores in the present example), which concurrently execute tasks that are assigned to them by a central scheduling unit (CSU) 26. In executing their respective tasks, cores 22 read and write program instructions and data from and to a shared memory 24. Cores 22 may comprise any suitable sort of programmable processors, operating under control of logical instructions passed to them by CSU 26, such as digital signal processing (DSP) cores or other processing units with a predefined instruction set. For example, in one embodiment, cores 22 comprise CEVA-X1643 DSP cores, available from CEVA, Inc. (Mountain View, Calif.). Cores 22 typically comprises a local cache and suitable interfaces to the other components of device 20, as are known in the art.

CSU 26 is connected to cores 22 by a network of distribution units 28, 30, 32, which allocate tasks selected by the CSU to the processing cores for execution, and report the termination of the tasks from the processing cores to the CSU. The distribution units are arranged in a hierarchical tree, comprising:
  Leaf distribution units (DU1) 32, each communicating with a respective group of cores 22.
  Intermediate distribution units (DU0) 30, each communicating with a respective set of leaf distribution units 32.
  A single root distribution unit (DUR) 28, which is coupled between CSU 26 and intermediate distribution units 30.

Root distribution unit 28 distributes the tasks selected for execution by CSU 26 among intermediate distribution units 30, for allocation down the tree via leaf distribution units 32 to cores 22. The distribution units also consolidate and report the termination of the tasks, as well as the availability of the cores, up the tree from the cores to the CSU. Details of the logical structure and operation of distribution units 30, 32 are described hereinbelow with reference to FIG. 2, while details of CSU 26 are described with reference to FIG. 3. Although FIG. 1 shows a certain structure of the distribution network in device 20, with three levels of hierarchy and four downward branches from each node, the principles of the present invention may similarly be applied over distribution networks of other topologies, with larger or smaller numbers of levels and elements in each level.

Shared memory 24 comprises multiple memory banks 34, for example 256 banks of 16 KB each, which are accessed by cores 22 via read and write networks 36, which permit pipelined, concurrent access to data. A memory interface 38 enables cores 22, as well as external direct memory access (DMA) engines 40, to read and write to and from memory banks 34 via networks 36. The structure of shared memory 24 is beyond the scope of the present description and may be of any suitable type that is known in the art. For example, shared memory 24 may be configured in the manner described in U.S. Patent Application Publication 2009/0125685, whose disclosure is incorporated herein by reference.

Device 20 also comprises DMA engines 40, which communicate with a peripheral bus 42 and thus enable data exchange with input/output (I/O) sources 46, such as external memory, storage devices, and system controllers. Upon receipt of certain external data and commands, DMA engine 40 activates an interrupt controller 44, which reports external events to CSU 26.

The components of device 20, including processing cores, memory, and hardware logic circuits used in CSU 26 and the distribution network, are typically implemented in a single IC chip. Alternatively, these components may be distributed among multiple chips with suitable high-speed interconnects. All such alternative embodiments are considered to be within the scope of the present invention.

Figure 2:
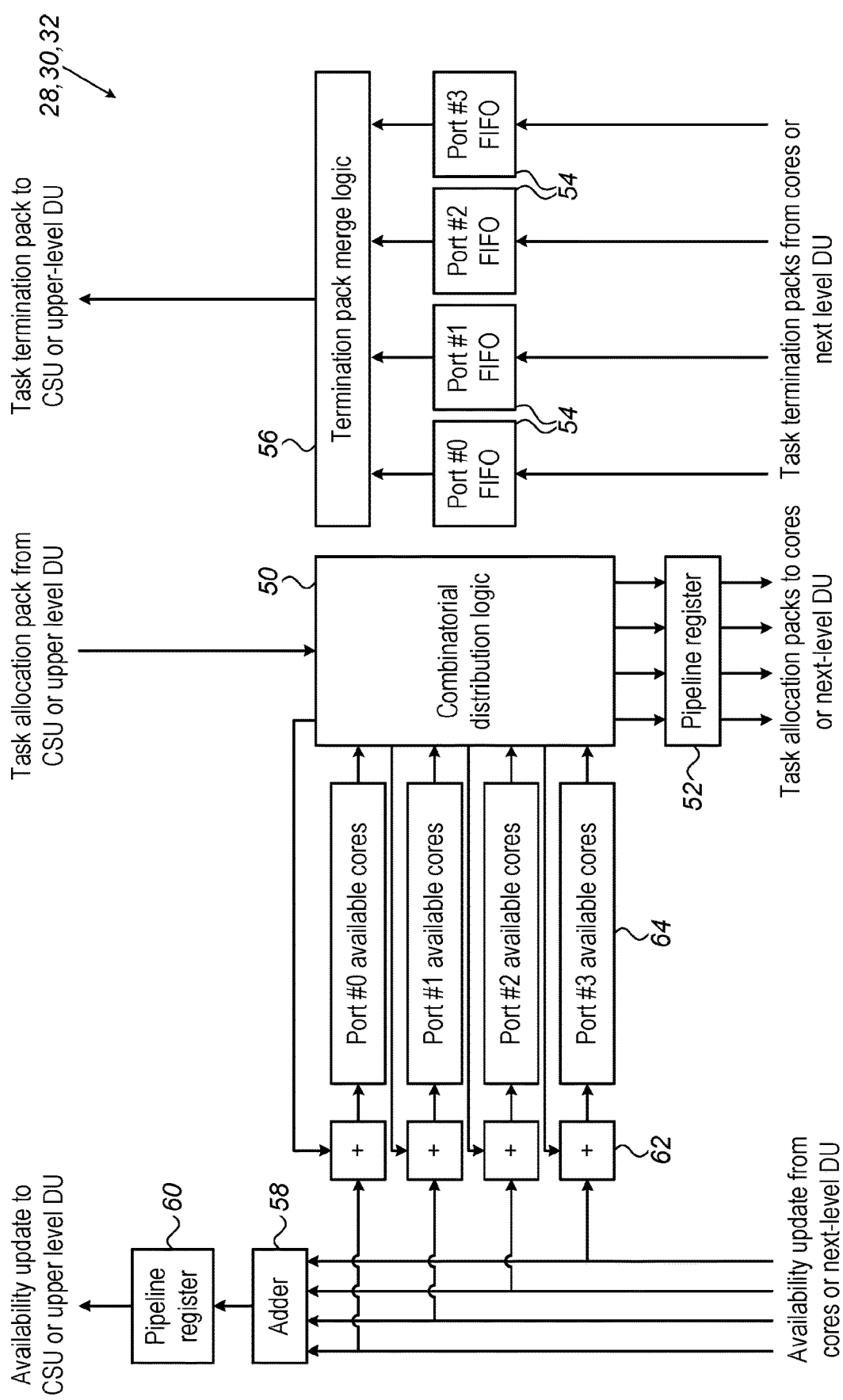
FIG. 2 is a block diagram that schematically illustrates a distribution unit for task allocation among processing cores, in accordance with an embodiment of the invention.

FIG. 2 is a block diagram that schematically shows details of distribution units 28, 30 and 32, in accordance with an embodiment of the invention. The distribution units in all levels of the hierarchical distribution tree are closely similar or identical, with the only substantive difference being in the components with which distribution units in each level communicate upward and downward in the hierarchy. Each distribution unit has one port directed upward to the next level above it in the hierarchy (which may be another distribution unit or may be CSU 26 in the case of root distribution unit 28) and four ports directed downward (to lower-level distribution units or to cores 22 in the case of leaf distribution units 32).

When CSU 26 has selected a task for allocation, it passes a task allocation pack downward through the distribution network. The task allocation pack typically contains a task identifier (task ID) and task origin, indicating the start address of the task in memory 24. For duplicable tasks, the allocation pack also holds an instance number for each instance to be allocated. Distribution units 28, 30 and 32 receive and process the task allocation packs in combinatorial distribution logic 50, which selects the ports through which the task is to be passed downward through the distribution network via a pipeline register 52. Regular tasks will be passed to a single downward port, whereas for duplicable tasks with multiple instances outstanding for execution, the distribution unit may allocate multiple instances of the duplicable task down the hierarchical tree, possibly through multiple downward ports, for concurrent execution among cores 22.

Upon termination of a given task (including an allocated instance of a duplicable task), each core 22 reports the completion of the task by passing a termination pack up to its leaf distribution unit 32. The termination pack typically includes the task ID and, for regular tasks, the value of the termination flag (which may be a single bit). Distribution units 28, 30 and 32 receive the termination packs via port FIFOs 54 and pass them upward through the hierarchy in order to inform CSU 26 of task termination. For duplicable tasks, termination pack merge logic 56 in the distribution units consolidates and reports the termination packs up the hierarchical tree to the root distribution unit, which submits a single report to the CSU with respect to the termination of multiple instances of the task (or possibly all the allocated instances).

In addition to reporting task terminations, cores 22 also report to leaf distribution units 32 upon becoming available to receive a new task. An adder 58 in each leaf distribution unit consolidates and reports the number of available cores, via a pipeline register 60, up the hierarchical tree to the next level. Each successive level of distribution units in the hierarchy sums the number of available cores in the levels below it, up to root distribution unit 28. Each distribution unit also sums the number of available cores on each of its downward ports in a respective adder 62, and enters the result in a corresponding port availability register 64. Combinatorial distribution logic 50 allocates the selected tasks among the downward ports depending on the reported availability of the processing cores, and decrements the values in registers 64 when a task is allocated.

Figure 3:
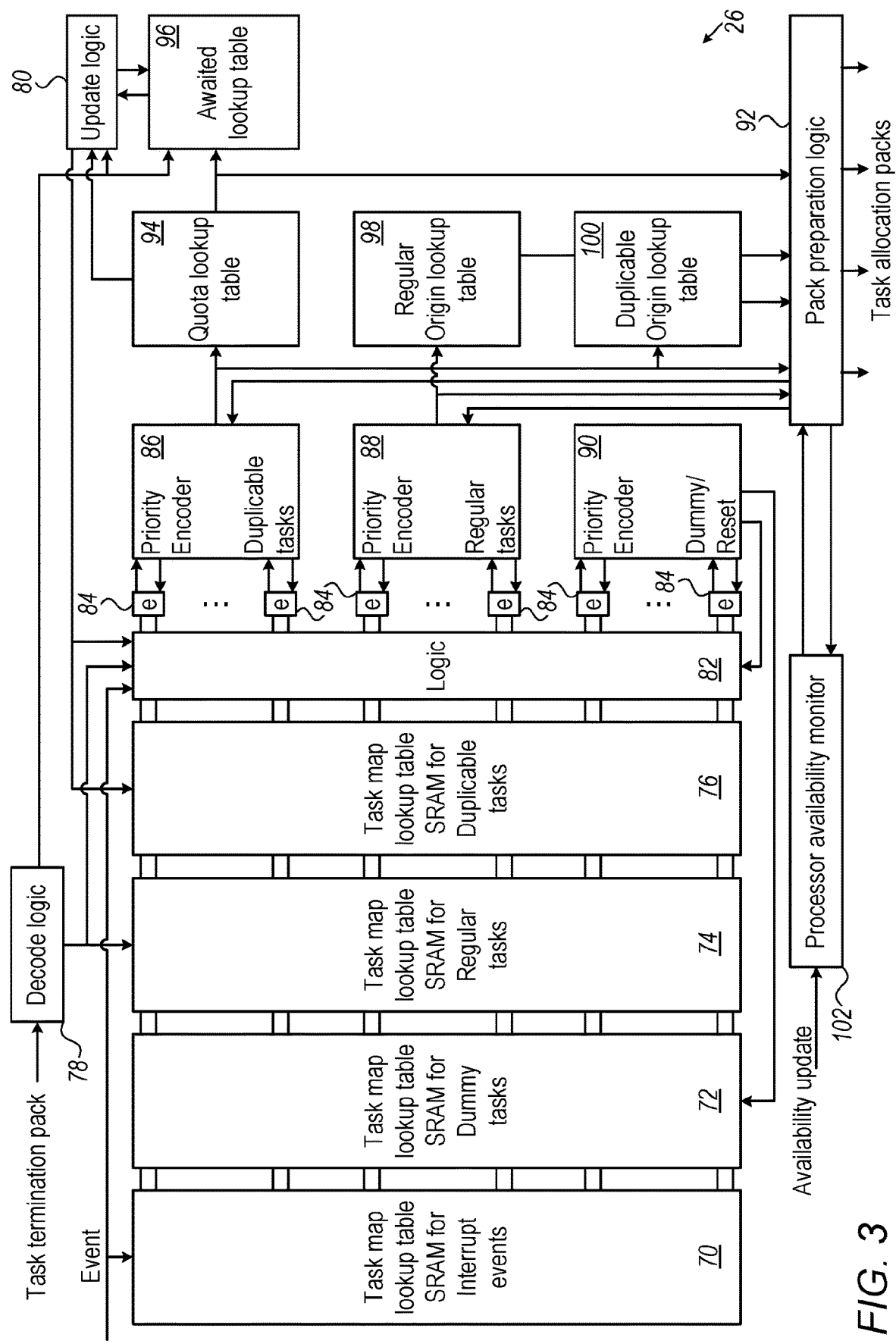
FIG. 3 is a block diagram that schematically illustrates a central synchronizing and scheduling unit in a multiprocessor device, in accordance with an embodiment of the invention.

FIG. 3 is a block diagram that schematically shows details of CSU 26, in accordance with an embodiment of the invention. CSU 26 comprises a memory, for example, static random access memory (SRAM), holding look-up tables (LUTs) that list of tasks for allocation to the processing cores, as well as respective conditions for enabling of each of the tasks. Logic circuits in CSU 26 access these tables in order track task terminations, to select new tasks to be allocated to cores 22, and to compose and issue task allocation packs to root distribution unit 28 accordingly.

The LUTs held in memory by CSU 26 include task map LUTs 70, 72, 74 and 76, defining the edges (or equivalently, arcs) of the dependency graphs in the current task map, as specified by a programmer of device 20. Triggering of LUTs 70, 72, 74 and 76 is equivalent to passing tokens for each listed task, representing the respective conditions for enabling the task. (The task maps will be described in greater detail hereinbelow.) The conditions listed in the task maps typically include events that are input to device 20 from external sources, such as interrupts generated by interrupt controller 44, and terminations of one or more precedent tasks that are reported by the distribution network. Decode logic 78 receives the termination packs that are passed up the distribution network hierarchy through root distribution unit 28 for input to the task maps. For this purpose, decode logic 78 separates the terminations of regular tasks from duplicable tasks and applies the results accordingly, as described below.

In the example shown in FIG. 3, CSU 26 specifically includes the following LUTs:

Task map LUT 70 for interrupt events contains a data word for each possible event identifier, with a bit corresponding to each of the tasks in the task map. The bit corresponding to a given task is set to 1 in the word belonging to a given event if this event is a token for enabling the task.

Task map LUT 72 for dummy tasks contains a data word for each dummy task, with a bit corresponding to each of the tasks in the task map. Dummy tasks terminate as soon as they are enabled and are not allocated to cores 22. They are supported by CSU 26 as a programming construct for convenient definition of the conditions for enabling tasks.

Task map LUT 74 for regular tasks contains a data word for each possible regular task identifier, with a bit corresponding to each of the tasks in the task map. Regular tasks differ from other tasks, however, in that the bit of the word in LUT 74 corresponding to each possible subsequent task will depend upon the value of the termination flag that was set by the core 22 that executed the task. LUT 74 may thus contain two data words for each regular task: one for the subsequent tasks that are to be enabled when the termination flag is set to '1', and the other for tasks that are to be enabled when the flag is '0'. Subsequent tasks that are indifferent (flag value 'u') to the value of the termination flag for a given precedent task will have their corresponding bit set in both words.

Task map LUT 76 for duplicable tasks contains a data word for each duplicable task, with a bit corresponding to each of the tasks in the task map. Update logic 80 counts the number of terminations reported by decoding logic 78 of instances of each duplicable task and triggers the corresponding word in LUT 76 only when all instances of the task have been allocated and terminated. Update logic 80 uses information provided in this regard by an awaited LUT 96, which is described further hereinbelow.

Each task that is included in the task map has one corresponding enabling cell 84 that is programmed to enable it. Transfer logic 82 links LUTs 70, 72, 74 and 76 to enabling cells 84 by indicating when the output from an LUT to the enabling cell is valid, as the result of an event or termination of a precedent task. For example, when CSU 26 receives an event with a given event ID, the corresponding word in LUT 70 will cause logic 82 to pass a token to each enabling cell 84 for which the word contains a 1. Termination of precedent tasks will have a similar effect in LUTs 72, 74 and 76.

Enabling cell 84 comprises logical components, for example a set of flip-flops, which store tokens corresponding to the inputs received from transfer logic 82. The logic in enabling cell 84 can be programmed, based on the task map, to apply a logical operation over the tokens, such as an AND operation (meaning that all tokens must be received in order to enable the corresponding task) or an OR operation (meaning that one of the tokens is sufficient). In this manner, the output of each enabling cell 84 will be set only when the condition for enabling the corresponding task have been met. After the task has been selected for allocation by CSU 26, enabling cell 84 is reset.

In each operating cycle of CSU 26, multiple tasks may be enabled, due to occurrence of the required events and/or terminations. Priority encoders 86, 88 and 90 therefore arbitrate among the tasks whose enabling cells 84 are set, based on priorities of the listed tasks, so that the enabled tasks with highest priority are executed first. (For example, tasks with lower indices may automatically have higher priority.) Encoder 86 selects among the enabled duplicable tasks; encoder 88 among the regular tasks; and encoder 90 among any dummy and reset tasks. As noted earlier, dummy tasks terminate as soon as they are selected, and the output of encoder therefore feeds back directly to task map LUT 72. "Reset tasks" are dummy tasks that are used to pass reset tokens to other tasks that are subject to AND conditions, thus clearing existing tokens in preparation for re-enabling the tasks by new tokens.

Regular and duplicable tasks that are selected by encoders 88 and 86, respectively, are passed to pack preparation logic 92, which assemble the task allocation packs for distribution via root distribution unit 28. For this purpose, logic 92 reads the respective pointers to the start addresses of the tasks in memory 24 from a regular origin LUT 98 and a duplicable origin LUT 100. A processor availability monitor 102 indicates to logic 92 how many of cores 22 are available to receive new tasks, based on the availability updates provided by root distribution unit 28. Typically, logic 92 will first allocate any regular tasks that have been selected for execution, followed by as many instances of the selected duplicable task as can be accommodated by the available cores.

As noted earlier, each of the duplicable tasks has a respective quota, which is held in quota LUT 94. When a given duplicable task is selected by priority encoder 86, awaiting LUT 96 updates the number of instances that are outstanding up to the quota value, and logic 92 will start to allocate instances of the duplicable task to whatever cores 22 are or become available until the respective quota is reached. As instances of the duplicable task are terminated, awaiting LUT 96 decrements the number of instances in response to termination reports received from decoding logic 78. Update logic 80 tracks the number of instances that have been terminated and, when the entire quota has been terminated for a given duplicable task, triggers the corresponding word in task map LUT 76.

Example Task Map

Figure 4:
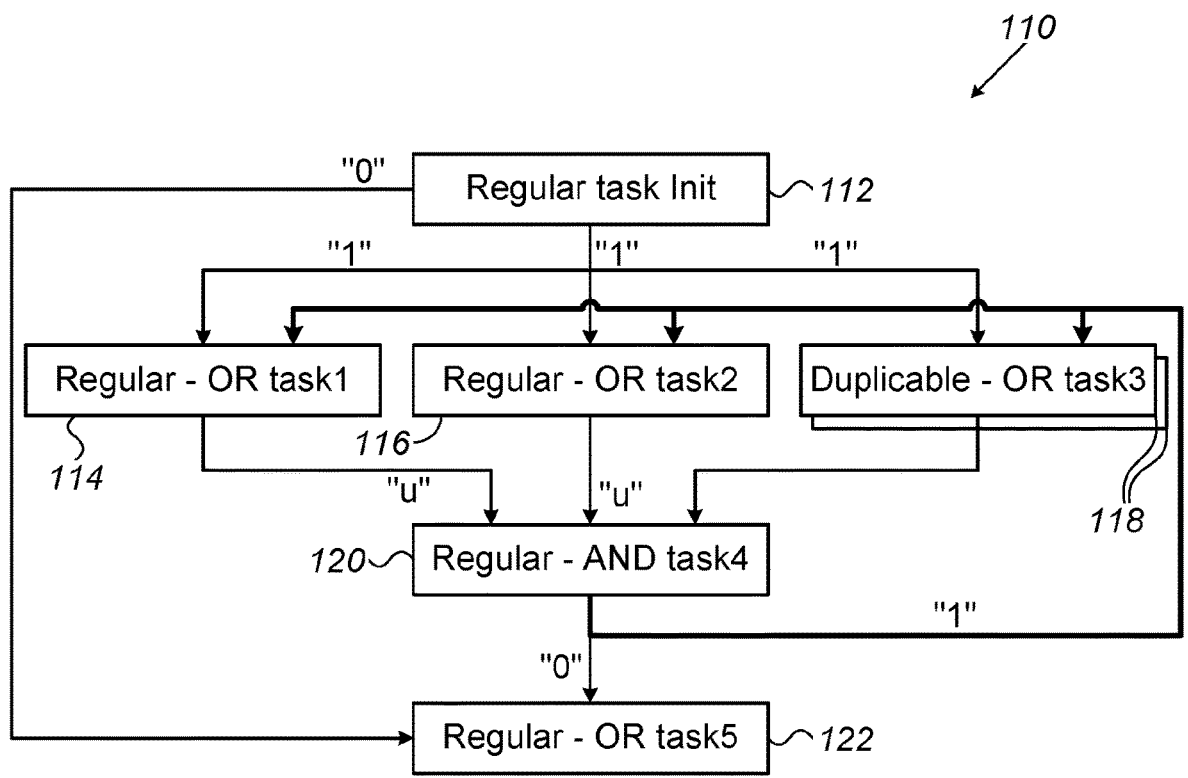
FIG. 4 is a graph that schematically illustrates a task map, in accordance with an embodiment of the invention.

FIG. 4 is a graph that schematically illustrates a task map 110, in accordance with an embodiment of the invention. Task map 110 illustrates the sort of task interrelations that can be defined using the programming model embodied in CSU 26, as described above.

Task map 110 originates with an Init task 112—a regular task with no dependency on the other tasks in the task map. CSU 26 will therefore allocate task 112, possibly in response to an external event (not defined in FIG. 4), without waiting for any other task to terminate.

Regular task 114 (task1) and regular task 116 (task2), as well as a duplicable task 118 (task3), all have OR enabling condition types. Tasks 114, 116 and 118 thus depend on issuance of either the '1' output token upon termination of Init task 112 or the '1' output token upon termination of another regular task 120 (task4). The choice of output token type from tasks 112 and 120 enables the programmer to control the flow of execution of task map 110. Thus, when Init task 112 terminates with a '0' output token, the control flow will bypass the loop through the other tasks and pass directly to a terminating regular task 122 (task5).

Regular task 120 has an AND enabling condition, meaning that regular tasks 114 and 116 and duplicable task 118 must all terminate in order for task 120 to be enabled. The 'u' inputs to task 120, however, indicate that enablement of this task is independent of the termination token type of regular tasks 114 and 116. The program code of task 120 can be written to include a counter or other condition, for example, in order to determine how many loop iterations through task map 110 will be performed. Task 120 will terminate with the token '1', thus repeating the loop, until the iterations are completed. Once the prescribed number of iterations has been completed, the output token from task 120 will change to '0', thus enabling the final task 122 (which has an OR enabling condition).

The quota of duplicable task 118 can be defined in the program code of Init task 112, and can be updated by regular task 120 in subsequent iterations. (To avoid race conditions, regular tasks 114 and 116 should not update the quota.)

The following task map syntax can be used by a programmer to define task map 110, as shown in FIG. 4:

regular task init( )
regular task Task1(init/1|task4/1)
regular task task2(init/1|task4/1)
duplicable task task3(init/1|task4/1)
regular task task4(task1/u & task2/u & task3)
regular task task5(task4/0|init/0)

The LUTs in CSU 26, as described above, can then be populated by compiling the definitions listed above. Alternatively, the programmer can manually define the contents of the LUTs.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computational apparatus, comprising:
   multiple processing cores, which are configured to concurrently execute tasks that are respectively assigned to each of the processing cores;
   a central scheduling unit (CSU), which comprises a CSU memory configured to hold one or more look-up tables (LUTs) listing tasks for allocation to the processing cores and respective conditions for enabling of each of the tasks, and which is configured to receive indications of termination of the tasks by the processing cores, and to select, responsively to the indications, enabled tasks from the one or more LUTs for allocation to the processing cores,
   wherein the one or more LUTs comprise a task map, which is configured to be defined by a programmer of the apparatus and indicates, for each listed task, the respective conditions for enabling the task, wherein the conditions include the termination of one or more precedent tasks; and
   a network of distribution units, which are connected between the CSU and the processing cores and are configured to allocate the selected tasks from the CSU to the processing cores for execution and to report the termination of the tasks from the processing cores to the CSU.

2. The apparatus according to claim 1, and comprising a shared memory, wherein the processing cores are configured to read and write data from and to the shared memory in executing the tasks.

3. The apparatus according to claim 1, wherein the network comprises a hierarchical tree of the distribution units, comprising:
   a first plurality of leaf distribution units, each coupled to communicate with a respective group of the processing cores;
   a second plurality of intermediate distribution units, each coupled to communicate with a respective set of the leaf distribution units; and
   a single root distribution unit, which is coupled between the CSU and the intermediate distribution units so as to distribute the tasks selected by the CSU among the intermediate distribution units, for allocation via the leaf distribution units to the processing cores, and to consolidate and report the termination of the tasks from the processing cores to the CSU.

4. The apparatus according to claim 3, wherein the tasks include duplicable tasks, and wherein the distribution units are configured to allocate multiple instances of the duplicable tasks down the hierarchical tree for concurrent execution among the processing cores.

5. The apparatus according to claim 3, wherein the processing cores are configured to report to the leaf distribution units upon becoming available to receive a new task, and wherein the leaf and intermediate distribution units are configured to consolidate and report availability of the processing cores up the hierarchical tree to the root distribution unit, which allocates the selected tasks among the intermediate distribution units responsively to the reported availability of the processing cores.

6. The apparatus according to claim 4, wherein the distribution units are configured to receive the indications of the termination of the allocated instances of the duplicable tasks from the processing cores, and to consolidate and report the indications up the hierarchical tree to the root distribution unit, which is configured to submit a single report to the CSU with respect to the termination of multiple allocated instances.

7. The apparatus according to claim 1, wherein the tasks comprise regular tasks, to be executed by a single processing core, and duplicable tasks, to be allocated in multiple instances for concurrent execution by a plurality of the processing cores.

8. The apparatus according to claim 7, wherein the indications of the termination of the regular tasks comprise a flag having multiple possible values, wherein the flag is set by the processing cores upon the termination of each task and is reported by the distribution units to the CSU, which is configured to select a subsequent task for allocation to the processing cores responsively to a value of the flag.

9. The apparatus according to claim 1, wherein the conditions indicated in the task map include, for at least some of the tasks, an event input to the apparatus from a source external to the processing cores.

10. The apparatus according to claim 1, wherein the conditions for enabling the tasks include, for at least some of the tasks, a logical operation to be applied over the indications of the termination of the one or more precedent tasks.

11. The apparatus according to claim 1, wherein the listed tasks have respective priorities, and wherein the CSU is configured to select the tasks for allocation to the processing cores from among the enabled tasks responsively to the respective priorities.

12. Computational apparatus, comprising:
multiple processing cores, which are configured to concurrently execute tasks that are respectively assigned to each of the processing cores;
a central scheduling unit (CSU), which comprises a CSU memory configured to hold one or more look-up tables (LUTs) listing tasks for allocation to the processing cores and respective conditions for enabling of each of the tasks, and which is configured to receive indications of termination of the tasks by the processing cores, and to select, responsively to the indications, enabled tasks from the one or more LUTs for allocation to the processing cores; and
a network of distribution units, which are connected between the CSU and the processing cores and are configured to allocate the selected tasks from the CSU to the processing cores for execution and to report the termination of the tasks from the processing cores to the CSU,
wherein the tasks comprise regular tasks, to be executed by a single processing core, and duplicable tasks, to be allocated in multiple instances for concurrent execution by a plurality of the processing cores, and
wherein each of the duplicable tasks has a respective quota, and wherein the CSU is configured, when the respective conditions for enabling a given duplicable task are satisfied, to allocate the instances of the duplicable task to the processing cores that are available until the respective quota is reached.

13. A method for computation, comprising:
providing multiple processing cores, which are configured to concurrently execute tasks that are respectively assigned to each of the processing cores, and are connected by a network of distribution units to a central scheduling unit (CSU), which allocates the tasks to the processing cores;
storing in a memory one or more look-up tables (LUTs) listing the tasks for allocation to the processing cores and respective conditions for enabling of each of the tasks,
wherein the one or more LUTs comprise a task map, which is configured to be defined by a programmer and indicates, for each listed task, the respective conditions for enabling the task, wherein the conditions include a termination of one or more precedent tasks;
receiving into the CSU from the network of distribution units indications of the termination of the allocated tasks by the processing cores; and
selecting in the CSU, responsively to the indications, enabled tasks from the one or more LUTs for allocation to the processing cores.

14. The method according to claim 13, wherein the processing cores read and write data from and to a shared memory in executing the tasks.

15. The method according to claim 13, wherein the network comprises a hierarchical tree of the distribution units, comprising:
a first plurality of leaf distribution units, each coupled to communicate with a respective group of the processing cores;
a second plurality of intermediate distribution units, each coupled to communicate with a respective set of the leaf distribution units; and
a single root distribution unit, which is coupled between the CSU and the intermediate distribution units,
wherein the method comprises distributing the tasks selected by the CSU from the root distribution unit to the intermediate distribution units, for allocation via the leaf distribution units to the processing cores, and
wherein receiving the indications of termination comprises consolidating and reporting the termination of the tasks from the root distribution unit to the CSU.

16. The method according to claim 15, wherein the tasks include duplicable tasks, and wherein distributing the tasks comprises allocating multiple instances of the duplicable tasks down the hierarchical tree for concurrent execution among the processing cores.

17. The method according to claim 15, and comprising reporting from the processing cores to the leaf distribution units upon becoming available to receive a new task, and consolidating and reporting availability of the processing cores up the hierarchical tree to the root distribution unit,
wherein distributing the tasks comprises allocating the selected tasks among the distribution units responsively to the reported availability of the processing cores.

18. The method according to claim 16, wherein the consolidating and reporting the termination comprises receiving the indications of the termination of the allocated instances of the duplicable tasks from the processing cores, and consolidating and reporting the indications up the hierarchical tree to the root distribution unit, which submits a single report to the CSU with respect to the termination of multiple allocated instances.

19. The method according to claim 13, wherein the tasks comprise regular tasks, to be executed by a single processing core, and duplicable tasks, to be allocated in multiple instances for concurrent execution by a plurality of the processing cores.

20. The method according to claim 19, wherein the indications of the termination of the regular tasks comprise a flag having multiple possible values, and wherein the flag is set by the processing cores upon the termination of each task and is reported by the distribution units to the CSU, wherein selecting the enabled tasks comprises enabling a subsequent task for allocation to the processing cores responsively to a value of the flag.

21. The method according to claim 19, wherein each of the duplicable tasks has a respective quota, and wherein selecting the enabled tasks comprises, when the respective conditions for enabling a given duplicable task are satisfied, allocating the instances of the duplicable task to the processing cores that are available until the respective quota is reached.

22. The method according to claim 13, wherein the conditions indicated in the task map include, for at least some of the tasks, an event input to the method from a source external to the processing cores.

23. The method according to claim 13, wherein the conditions for enabling the tasks include, for at least some of the tasks, a logical operation to be applied over the indications of the termination of the one or more precedent tasks.

24. The method according to claim 13, wherein the listed tasks have respective priorities, and wherein selecting the enabled tasks comprises selecting the tasks for allocation to the processing cores from among the enabled tasks responsively to the respective priorities.

\* \* \* \* \*